Aug. 4, 1964 D. M. LEAKEY 3,143,661

AMPLITUDE SENSITIVE TERMINATION

Filed Sept. 15, 1960 2 Sheets-Sheet 1

United States Patent Office 3,143,661

Patented Aug. 4, 1964

3,143,661

AMPLITUDE SENSITIVE TERMINATION

David M. Leakey, Eastcote, Ruislip, England, assignor to The General Electric Co., Ltd.

Filed Sept. 15, 1960, Ser. No. 56,268
Claims priority, application Great Britain Oct. 8, 1959
5 Claims. (Cl. 307—88.5)

Figure 1:
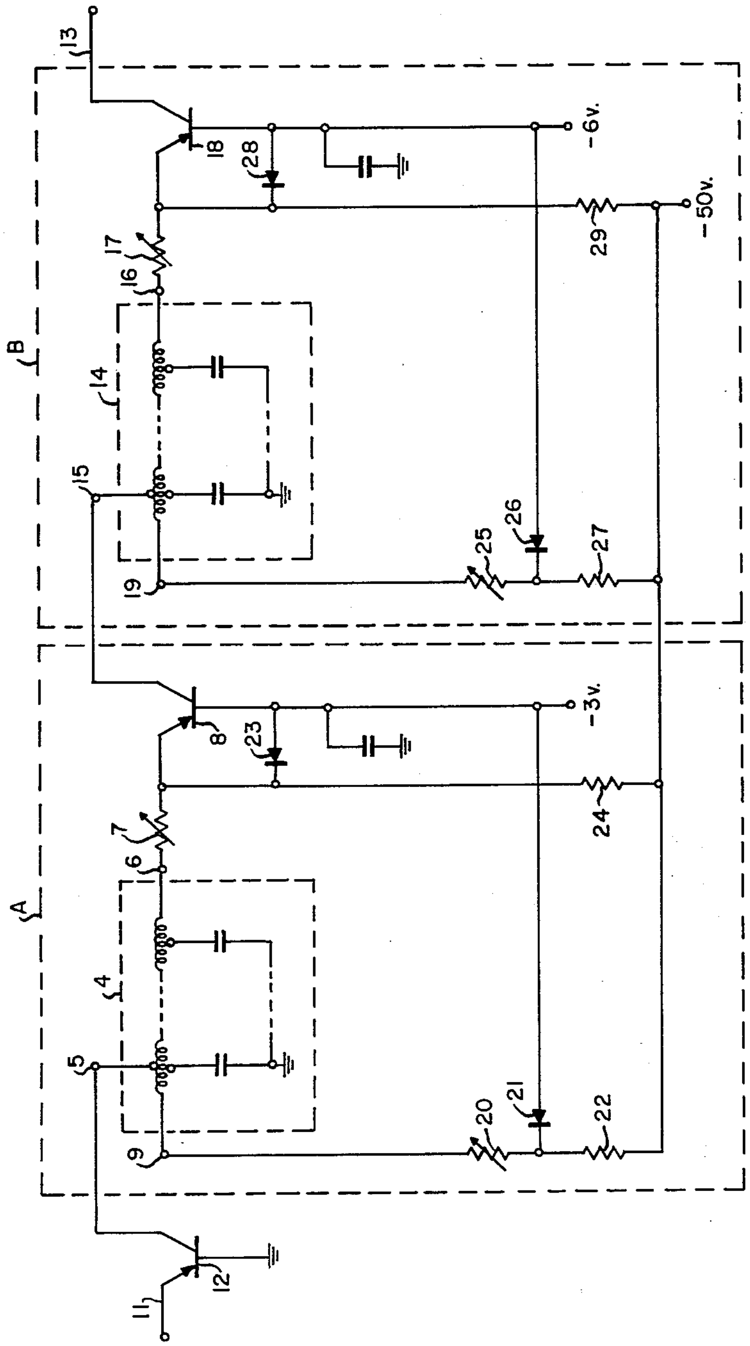

This invention relates to terminations and more particularly to terminations for delay lines used in electric pulse circuits.

Delay lines are commonly used, for example in electric pulse communication systems to effect delay in the pulses of a pulse train. In these circumstances there is however the disadvantage that pulses of the pulse train applied to the input of the delay line give rise to reflections within that line on reaching the output after passage along the line. These reflections pass back along the line to the input and may therefore give rise to further reflections, any of which may cause undesirable interference with later pulses of the pulse train passed through the line.

The effects of such reflections may be reduced in a pulse circuit including a delay line by arranging that in that circuit the input of the delay line is properly terminated as far as the reflections from the output of the line are concerned, so that a high proportion of the energy of any reflection from the output of the delay line is dissipated at the input. However, the presence of such a termination at the input of the delay line gives rise to the disadvantage that a high proportion of the energy of any pulse of the pulse train applied to that input is similarly dissipated. This results in undue loss of the pulse energy.

It is, therefore, an object of the present invention to provide a termination which avoids one or more disadvantages of the prior art.

It is an additional object of the present invention to provide an amplitude discriminating termination which may be used with a delay line to provide a relatively low impedance to undesired signals and a higher impedance to information signals.

In accordance with the invention, an amplitude sensitive termination for a delay line comprises a terminating impedance effectively in two sections, one of which approximates the characteristic impedance of the delay line, and a normally conductive rectifier which effectively shorts out the other section of the terminating impedance but which becomes non-conductive in response to a signal having at least a predetermined amplitude, thereby presenting a terminating impedance greater than the characteristic impedance to such signals.

For a better understanding of the present invention, together with other and further objects thereof, reference is had to the following description taken in connection with the accompanying drawings, and its scope will be pointed out in the appended claims.

Figure 2:
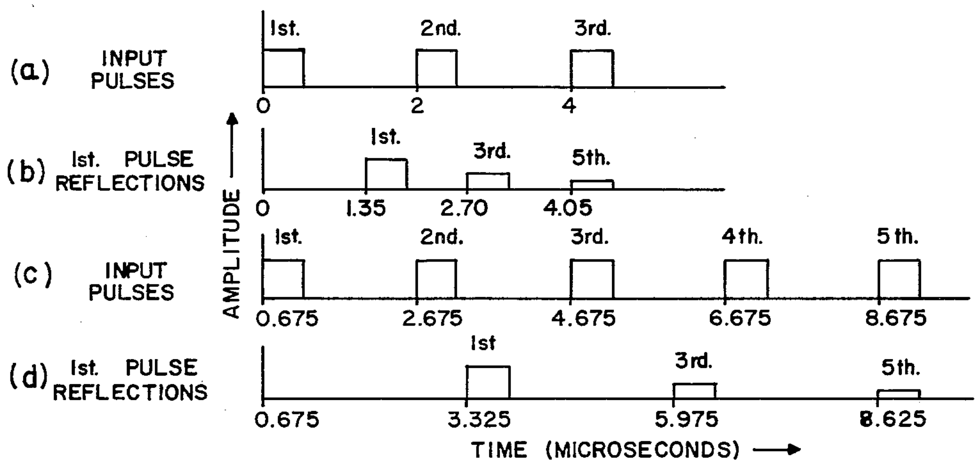
Figure 3:
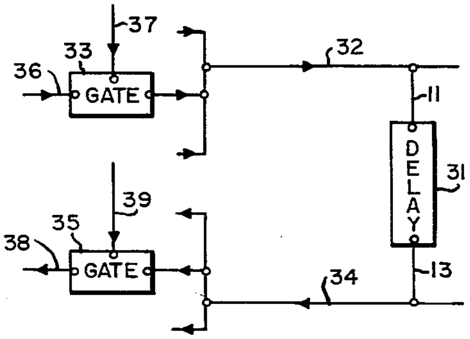

In the drawings:

FIG. 1 is a circuit diagram of the delay circuit;

FIGS. 2(*a*) to (*d*) are diagrammatic representations of the timings of pulses and reflections within delay lines in the delay circuit of FIG. 1, and FIG. 3 is a block schematic diagram of part of a telephone exchange including the delay circuit of FIG. 1.

Referring to FIG. 1, there is shown a complete electric pulse circuit including amplitude-sensitive terminations in accordance with the present invention. In this circuit, pulses of current to be delayed by the delay circuit are applied to that circuit over an input lead 11 which is connected to the emitter electrode of a PNP junction transistor 12. The base electrode of the transistor 12 is connected directly to ground and its collector electrode is connected to a delay stage A. The delay stage A is the first of two delay stages A and B that are connected in cascade between the transistor 12 and an output lead 13 of the circuit. The stages A and B together provide an over-all delay of two microseconds for the pulses applied over the lead 11, the delay time of the stage A being 0.675 microsecond and that of the stage B being 1.325 microseconds.

The delay stage A includes a delay line 4 having a delay time of 0.675 microsecond, and the collector electrode of the transistor 12 is connected directly to an input terminal 5 of this delay line. A pulse of collector current flows in the transistor 12, and therefore in the delay line 4, in response to each of the pulses applied over the input lead 11, but the transistor 12 is otherwise non-conducting. The pulses in this manner applied to the delay line 4 appear at an output terminal 6 of the delay line after the time delay of 0.675 microsecond.

The delayed pulses appearing at the output terminal 6 are applied through a variable resistor 7 to the emitter electrode of a PNP junction transistor 8. The base electrode of the transistor 8 is connected to a three volt negative bias source, and this transistor, which is normally nonconducting, conducts in response to each of the delayed pulses applied to its emitter electrode from the output terminal 6.

The pulses of collector current which flow in the transistor 8 are applied to the delay stage B to be delayed by a delay line 14 in that stage. The collector electrode of the transistor 8 is in fact connected directly to an input terminal 15 of the delay line 14, and the pulses applied to this terminal appear at an output terminal 16 of that delay line after the time delay of 1.325 microseconds.

The delayed pulses appearing at the output terminal 16 are applied through a variable resistor 17 to the emitter electrode of a PNP junction transistor 18. The base electrode of the transistor 18 is connected to a six volt negative bias source, and this transistor, which is normally nonconducting, conducts in response to each delayed pulse applied to its emitter electrode from the output terminal 16.

The output lead 13 of the delay circuit is connected directly to the collector electrode of the transistor 18 so that the pulses of collector current which flow in that transistor as a result of the pulses appearing at the terminal 16 also flow in that lead. These collector current pulses flow in the lead 13 two microseconds after the flow of the corresponding pulses in the lead 11, the delay lines 4 and 14 delaying the pulses applied over the lead 11 by successive periods of 0.675 and 1.325 microseconds.

The delay lines 4 and 14 comprise respectively twenty-seven and fifty-three center-tapped m-derived filter sections (of which only the first and last is shown in both cases). These delay lines have respective input terminals 9 and 19 additional to the input terminals 5 and 15, and these two additional terminals 9 and 19 are connected directly to the input ends of the respective first filter sections. The terminals 5 and 15 on the other hand are connected directly to the center-taps of those sections, and this fact serves to reduce the effect of the capacitive loading upon the lines 4 and 14 which is due to the base-to-collector capacitances of the transistors 8 and 18 respectively.

Referring to terminal 9, there is connected thereto an amplitude-sensitive termination including a terminating impedance made up of variable resistor 20 and resistor 22 and means responsive to a signal having at least a predetermined amplitude shown as rectifier 21. Variable resistor 20 is connected at one end to the terminal 9 of the delay line 4 and at the other end to the junction of rectifier 21 and resistor 22. The rectifier 21 and the resistor 22 are connected respectively to three and fifty volt negative bias sources so that in normal circumstances the rectifier 21 conducts with the result that there is a low resistance path to ground at the junction of the two resistors 20 and 22, effectively shorting out the portion of the terminating impedance shown as resistor 22.

In a similar manner the output terminal 6 of the delay line 4 has connected thereto an amplitude-sensitive termination including a terminating impedance made up of variable resistor 7 and resistor 24, means responsive to a signal having at least a predetermined amplitude shown as rectifier 23 and an electronic valve illustrated as transistor 8. Terminal 6 is connected, through the variable resistor 7, to the junction of a rectifier 23 and a resistor 24, the rectifier 23 and the resistor 24 being connected (as in the case of the rectifier 21 and the resistor 29) between respective three and fifty volt negative bias sources. The rectifier 23 is normally conducting so that in these circumstances there is a low resistance path to ground at the junction of the two resistors 7 and 24, effectively shorting out the portion of the terminating impedance shown as resistor 24.

To the input and output terminals 19 and 16 of the delay line 14 are connected additional amplitude-sensitive terminations. Thus, terminal 19 connects through a variable resistor 25 to the junction of a rectifier 26 and a resistor 27, and the output terminal 16 of that delay line is connected, through the variable resistor 17, to the junction of a rectifier 28 and a resistor 29. The resistor 25, 27 and 29 together with the rectifiers 26 and 28 in the stage B are arranged in the same manner as the corresponding resistors 20, 22 and 24 and rectifiers 26 and 28 in the stage A except that the rectifiers 26 and 28 are connected to six volt negative bias sources rather than to three volt sources.

In operation, a train of regularly recurrent current pulses is applied to the delay circuit over the lead 11, these pulses each having a duration of 0.5 microsecond and the pulse train having a pulse recurrence period of two microseconds. Each pulse applied to the transistor 12 over the lead 11 causes collector current to flow through the resistor 20 to render the rectifier 21 nonconducting, changing the effective impedance from the relatively low impedance presented by resistor 20 to a higher impedance, as presented by resistors 20 and 22 in series. This current flows in the resistor 20 for the duration of the pulse so that during this pulse, the resistance to ground at the junction of the rectifier 21 and the resistor 22 has a high value. In consequence, a high proportion (for example ninety-five percent) of the collector current flowing in the transistor 12 flows in the delay line 4 to result in the appearance of a pulse, 0.675 microsecond later, at the output terminal 6.

The current which flows through the resistor 7 on the appearance of the delayed pulse at the terminal 6 causes the rectifier 23 to become nonconducting for the duration of that pulse. In these circumstances, therefore, a high proportion of the current flowing through the resistor 7 flows in the transistor 8 to result in the application of that pulse to the stage B.

The resistance of the resistor 7 is set so that during the delayed pulse at the terminal 6, the resistance to ground from that terminal is substantially equal to the characteristic impedance of the day line 4 in order that the output of this delay line shall be properly terminated at this time.

Any reflection from the output of the delay line 4 as a result of the pulse applied to the transistor 8, passes back along that line to its input to arrive at the input terminals 5 and 9 some 1.35 microseconds after the application of the pulse over the lead 11. At this time the transistor 12 is non-conducting so that there is a high impedance between the terminal 5 and ground through that transistor. On the other hand, the resistance to ground at the terminal 9 is low being, in fact, substantially solely due to the resistor 20, since the rectifier 21 is conducting at this time.

It is arranged, by adopting a suitable setting of the resistor 7, that any reflection arriving at the input of the delay line 4 from the output of that line is either of a magnitude insufficient to cause the rectifier 21 to cease conducting or of the opposite sense so as to increase its conduction. In addition, the variable resistor 20 is set so that as far as reflections are concerned the resistance between the terminal 9 and ground is substantially equal to the characteristic impedance of the line 4. These is, therefore, a good termination at the input of the line for the first reflection. It will now be seen that this termination is efficient to change the effective impedance from a relatively low impedance to a higher impedance when signals having a predetermined amplitude are present.

Any reflection from the input of the delay line 4, a second reflection resulting from the first reflection, passes along that delay line to appear at the output terminal 6. On the appearance of this second reflection at the terminal 6 the rectifier 23 is conducting and it is arranged that this condition remains unchanged by that reflection. The transistor 8 remains nonconducting, responding only to signals having a predetermined amplitude, so that the reflection is not passed from the stage A to the stage B, but since the rectifier 23 is conducting, there is a low resistance path to ground from the terminal 6 for this reflection. The resistance of this path, being substantially solely due to the resistor 7, is substantially equal to the characteristic impedance of the delay line 4 so that there is a good termination at the output of the line for the second reflection.

The third and fourth reflections which may result from the arrival of the second reflection at the output of the delay line 4 pass along that line in a similar manner to the first and second reflections, respectively. The third reflection arrives at the input of the delay line 4 to be met by the good termination provided substantially solely by the resistor 20. No pulse is applied to the input terminal 5 from the transistor 12 during the arrival of the third reflection at the input of the delay line. The fourth reflection on arrival at the output of that line is met by the good termination provided substantially solely by the resistor 7, and the transistor 8 remains nonconducting at this time. The fourth reflection, like the second reflection, is therefore not passed to the delay stage B.

Up till now only one other pulse has been applied to the transistor 12 from the lead 11, this pulse being applied to the input terminal 5 between the arrival of the first and third reflections at the input. This other pulse passes along the delay line 4 to the stage B in the same manner as the first pulse and is substantially unaffected by the reflections in that line. The next pulse, that is the third, applied to the transistor 12 is applied to the input terminal 5 concurrently with the arrival at the input of the delay line of the fifth reflection of the first pulse. Owing to the application of the third pulse, the rectifier 21 ceases to conduct so that the input of the delay line is then improperly terminated for the fifth reflection. A large proportion of this fifth reflection (as the sixth reflection of the first pulse) is therefore transmitted along the delay line 4 with the third pulse. Since the third pulse is passed to the delay stage B in the same manner as the first and second pulses, the sixth reflection also passes to that stage. It will be appreciated, however, that the magnitude of the sixth reflection passed to the delay stage B is very small since five of the six reflections originate from good terminations of the delay line 4, and there has then been six traversals of that line since the first reflection.

The time patterns of the above-mentioned pulses and reflections appearing at the input of the delay line 4, and the time pattern of those pulses as applied to the input of the delay line 14 in the stage B, are shown in FIGS. 2(*a*), 2(*b*), and 2(*c*), respectively, the time scales in these three figures being taken from the time of application of the first pulse to the input of the delay line 4. In FIG. 2, the relative signal amplitudes are distorted for clarity, the pulses actually being greatly attenuated by successive reflections as described.

The operation of the delay stage B in response to the pulses applied from the stage A to the input terminal 15 of the delay line 14, is similar to that of stage A in response to the pulses applied to the input terminal 5. In this case, however, the delay of the delay line is 1.325 microseconds instead of 0.675 microsecond. The time pattern of the reflections of the first pulse as these appear at the input of the delay line 14 is shown in FIG. 2(*d*), the same time scale being used in this figure as in FIGS. 2(*a*), 2(*b*), and 2(*c*).

From FIG. 2(*d*) it will be appreciated that the only reflection of the first pulse within the delay line 14, to be passed through the transistor 18 to the output lead 13 is again the sixth reflection of that pulse. However, it should be observed that this sixth reflection passes to the output lead 13 with the fifth pulse, whereas the sixth reflection of the first pulse within the delay line 4 passes to this output lead 13, after passage through the delay line 14, with the third pulse. This is due to the fact that the delay lines 4 and 14 have different delay times, and has the effect that those reflections of the two delay lines 4 and 14 which do pass to the output lead 13 cannot augment one another.

The delay circuit described above with reference to FIG. 1 may find application in an automatic telephone exchange using the time division multiplex system of communication between subscribers. To illustrate this application, reference will now be made to FIG. 3 in which the delay circuit of FIG. 1 has been given the general reference "31."

Referring to FIG. 3, the input lead 11 of the delay circuit 31 is connected to receive amplitude-modulated pulses from a common multiplex pulse transmission highway 32. The pulses each have a duration of 0.5 microsecond and are applied to the highway 32 from a plurality of gates 33 (of which only one is shown). The pulses applied from the gates 33 are interlaced in time to form thereby a train of pulses having a pulse recurrence period of two microseconds.

This train of pulses is delayed by the delay circuit 31 and the delayed pulses appearing on the output lead 13 are passed over another common multiplex pulse transmission highway 34 to be received by a plurality of gates 35 (of which only one is shown).

During the setting-up of a call between a pair of subscribers connected to the exchange, a first of those subscribers is individually allotted one of the gates 33 and the second is individually allotted one of the gates 35. In the subsequent call, the speech signals from the first subscriber are applied to his allotted gate 33 over a lead 36 which is individual to that particular gate. A train of gating pulses is applied to this gate 33 over an individual lead 37 so that pulses of current in the time positions of the gating pulses and amplitude modulated by the speech signals are applied from that gate 33 to the highway 32.

After delay by the delay circuit 31 the amplitude-modulated pulses are applied to the highway 34 and thence to the gates 35. It is arranged that a train of suitably timed gating pulses is applied to that one of the gates 35 which has been allotted to the second subscriber in order that these amplitude-modulated pulses shall be passed by that gate to an individual output lead 38. The gating pulses are applied to the gate 35 over an individual lead 39, and the modulated pulses passed by this gate are thereafter demodulated to regain the speech signals originally applied to the lead 36, for receiption by the second subscriber.

Speech signals are similarly transmitted between other pairs of subscribers, the different pairs of subscribers being allotted different pairs of the gates 33 and 35. The timings of the gating pulses applied to those gates are such that the amplitude-modulated pulses from the different gates 33 are interlaced in time and only the appropriate amplitude-modulated pulses are passed by the respective gates 35.

If the delay circuit 31 was formed by a single delay line having a delay time of two microseconds, instead of as shown in FIG. 1, the second reflection of each amplitude-modulated pulse within that delay line would be transmitted with the pulse that occurs four microseconds later on the highway 32. In these circumstances there is cross-talk between the calls. Two reflections only are involved and, if as is usual, an over-all cross-talk ratio of better than −80 decibels is required, it is necessary to have terminations at both ends of the delay line which are matched to the characteristic impedance of that line to an accuracy of about one per cent. This strict requirement is extremely difficult to achieve.

The above difficulty is overcome with the delay circuit shown in FIG. 1, by arranging that the over-all delay is provided by the two delay stages A and B which are in effect interconnected only during the pulses. In these circumstances the only important reflections which contribute to cross-talk are those resulting from six reflections within either of the two stages, and this has the result that terminations having reflection coefficients of −14 decibels are all that is required. This assumes that matched terminations are permanently connected at both ends of the two delay lines, however with this there is the disadvantage that the resulting dissipation of the energy of the pulses themselves in those terminations involves a loss of some six decibels per delay line in the delay circuit. With the actual arrangement of FIG. 1, however, this disadvantage is also overcome since the matched terminations are effective only in the intervals between pulses.

In one delay circuit constructed as shown in FIG. 1 the delay lines 4 and 14 both have a characteristic impedance of one-hundred and twenty ohms. Since in this case the relevant input impedances of the transistors 8 and 18 is some forty ohms, the values of the resistors 7 and 17 are required to be appreciably smaller than the characteristic impedances of their respective lines. In these circumstances it is apparent that it may be desirable to use delay lines having larger characteristic impedances so that the input impedances of the transistors shall be proportionately smaller. In the present case, a value of about two-hundred and fifty ohms appears to be optimum, but in these circumstances it is necessary to double the bias voltages applied to the rectifiers 21, 23, 26 and 28 and to the base electrodes of the transistors 8 and 18.

Although the present invention is described above in relation to a delay line whose intended purpose is to delay pulses, it will be appreciated that the present invention may find application in cases for which there is in effect a delay line although the intended purpose of the "line" is not to obtain delay. For example, the present invention may find a further application in the kind of telephone exchange referred to above. In such an exchange it is common to transmit amplitude-modulated pulses from one unit to another in the exchange over lengths of coaxial cable and in order to reduce the effects of reflections within those cables it is necessary to provide good terminations for those reflections at both ends. The present invention may find application in such a case to save loss of energy of the input pulses, the termination at the input end of the cable being provided in the manner of the transistor 12, the resistors 20 and 22 and the rectifier 21 at the input of the delay line 4 in FIG. 1. The ouput end of the cable may be terminated of course in the same manner as the output of the delay line 4 is terminated by the transistor 8, the resistors 7 and 24 and the rectifier 23.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An amplitude sensitive termination for a delay line comprising: a terminating impedance effectively in two sections, one of which approximates the characteristic impedance of said delay line; and a normally conductive rectifier which effectively shorts out the other section of said terminating impedance but which becomes nonconductive in response to a signal having at least a predetermined amplitude, thereby presenting a terminating impedance greater than said characteristic impedance to such signals.

2. An amplitude sensitive termination for a delay line comprising: two resistors coupled in series, one of which approximates the characteristic impedance of said delay line; and a normally conductive rectifier which effectively shorts out the other resistor but which becomes nonconductive in response to a signal having at least a predetermined amplitude, thereby presenting substantially the two resistors in series as a terminating impedance for such signals.

3. An amplitude sensitive termination for a delay line comprising: a terminating impedance effectively in two sections, one of which approximates the characteristic impedance of said delay line; a normally conductive rectifier which effectively shorts out the other section of said terminating impedance but which becomes nonconductive in response to a signal having at least a predetermined amplitude, thereby presenting a terminating impedance greater than said characteristic impedance to such signals; and an electronic valve coupled to said rectifier which responds only to said signals, thereby rejecting signals reflected in said delay line.

4. A delay stage comprising: a delay line; and at least one termination including a terminating impedance, effectively in two sections, one of which approximates the characteristic impedance of said delay line, a normally conductive rectifier which effectively shorts out the other section of said terminating impedance but which becomes nonconductive in response to a signal having at least a predetermined amplitude, thereby presenting a terminating impedance greater than said characteristic impedance to such signals.

5. A delay stage comprising: input means for supplying a pulse train; an input termination coupled to said input means including an input terminating impedance and a normally conductive rectifier which effectively shorts out a portion of said input terminating impedance but which becomes nonconductive in response to a signal having at least predetermined amplitude, thereby presenting substantially the complete input terminating impedance to such signals; a delay line coupled to said input termination; and an output circuit including an output terminating impedance and a normally conductive rectifier which effectively shorts out a portion of said output terminating impedance, but which becomes nonconductive in response to a signal having at least a predetermined amplitude, thereby presenting substantially the complete output terminating impedance to such signals, and an electronic valve coupled to said rectifier which responds only to said signals, thereby rejecting signals reflected in said delay line.

References Cited in the file of this patent

UNITED STATES PATENTS

| | | |
|---|---|---|
| 2,850,703 | Vogelsong | Sept. 2, 1958 |
| 2,894,153 | Glomb | July 7, 1959 |